(12) United States Patent
Parkkila et al.

(10) Patent No.: US 12,363,527 B2
(45) Date of Patent: Jul. 15, 2025

(54) ENCRYPTION KEY MANAGEMENT AMONG NODES IN MESH NETWORKS

(71) Applicant: ITRON, INC., Liberty Lake, WA (US)

(72) Inventors: Tommi Petteri Parkkila, Cary, NC (US); Dathathreya Krishnabhat, Bengaluru (IN); Matthew Rockey, Fishers, IN (US)

(73) Assignee: ITRON, INC., Liberty Lake, WA (US)

( * ) Notice: Subject to any disclaimer, the term of this patent is extended or adjusted under 35 U.S.C. 154(b) by 180 days.

(21) Appl. No.: 17/934,072

(22) Filed: Sep. 21, 2022

(65) Prior Publication Data

US 2024/0098489 A1   Mar. 21, 2024

(51) Int. Cl.
*H04W 12/0471*   (2021.01)
*H04W 12/0433*   (2021.01)
*H04W 12/61*   (2021.01)

(52) U.S. Cl.
CPC ... *H04W 12/0471* (2021.01); *H04W 12/0433* (2021.01); *H04W 12/61* (2021.01)

(58) Field of Classification Search
CPC ......... H04W 12/0471; H04W 12/0433; H04W 12/61; H04W 12/041; H04L 9/088; H04L 9/0891; H04L 63/068; H04L 9/083
See application file for complete search history.

(56) References Cited

U.S. PATENT DOCUMENTS

| | | | |
|---|---|---|---|
| 8,584,228 B1 * | 11/2013 | Brandwine | H04L 61/45 713/160 |
| 9,129,283 B1 | 9/2015 | Raju | |
| 11,604,781 B2 * | 3/2023 | McHugh | G06F 16/2255 |
| 2006/0133614 A1 | 6/2006 | Zhang et al. | |
| 2008/0178003 A1 | 7/2008 | Eastham et al. | |
| 2009/0254750 A1 * | 10/2009 | Bono | H04L 63/065 380/282 |
| 2009/0316897 A1 * | 12/2009 | Kambayashi | H04L 9/0897 380/255 |

(Continued)

FOREIGN PATENT DOCUMENTS

EP   3 306 853 A1   4/2018

OTHER PUBLICATIONS

Extended European Search Report for Application No. 23196422.2 dated Feb. 8, 2024.

(Continued)

*Primary Examiner* — Quazi Farooqui
(74) *Attorney, Agent, or Firm* — Artegis Law Group, LLP

(57) ABSTRACT

Various embodiments disclosed herein provide techniques for managing encryption keys at nodes in a mesh network. In various embodiments, a method includes receiving, by a first node in a network, a first message from a second node; determining, by the first node, that a first key usable by the first node to decrypt the first message is outdated based on a comparison of a first key version identifier associated with the first key and a second key version identifier associated with a second key, where the second key was used to encrypt the first message, and the second key version identifier is received from the second node with the first message; and in response to determining that the first key is outdated, transmitting, by the first node to a key management service, a first request for an updated version of the first key to replace the first key.

20 Claims, 11 Drawing Sheets

(56) References Cited

U.S. PATENT DOCUMENTS

| | | |
|---|---|---|
| 2011/0188654 A1 | 8/2011 | Yao et al. |
| 2015/0341447 A1 | 11/2015 | Patil et al. |
| 2017/0338950 A1 | 11/2017 | Chen |
| 2018/0054302 A1 | 2/2018 | Shveykin et al. |
| 2019/0182041 A1 | 6/2019 | De Atley |
| 2020/0235945 A1 | 7/2020 | Li et al. |
| 2021/0019450 A1 | 1/2021 | Li et al. |
| 2021/0150038 A1 | 5/2021 | Valecha et al. |
| 2021/0248273 A1* | 8/2021 | Gupta .................. G06F 21/10 |
| 2021/0377016 A1 | 12/2021 | Perlman et al. |
| 2022/0021687 A1 | 1/2022 | Bhattacharya et al. |
| 2022/0191689 A1 | 6/2022 | Singh et al. |
| 2022/0229918 A1 | 7/2022 | Pottier et al. |
| 2022/0264631 A1 | 8/2022 | Wang et al. |

OTHER PUBLICATIONS

Extended European Search Report for Application No. 23196424.8 dated Feb. 15, 2024.
Non Final Office Action received for U.S. Appl. No. 17/934,074, dated May 22, 2024, 22 pages.
Non Final Office Action received for U.S. Appl. No. 17/934,074, dated Oct. 21, 2024, 24 pages.
Notice of Allowance received for U.S. Appl. No. 17/934,074, dated Mar. 7, 2025, 9 pages.

* cited by examiner

ENCRYPTION KEY MANAGEMENT AMONG NODES IN MESH NETWORKS

BACKGROUND

Field of the Various Embodiments

The various embodiments relate generally to mesh networks, and more specifically, to identification of an expired encryption key.

Description of the Related Art

In mesh networks, one or more nodes communicate using one more communication media, such as various wired connections (e.g., Ethernet, power line communication (PLC), or the like) and/or wireless connections (e.g., WiFi®, Bluetooth®, radiofrequency (RF) communication, or the like). Many such mesh networks are self-organized as peer-to-peer networks, in which connections are established in response to the nodes discovering one another rather than based on a predefined topology or a centralized server. In addition, communications between nodes in the network are often encrypted for security purposes.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
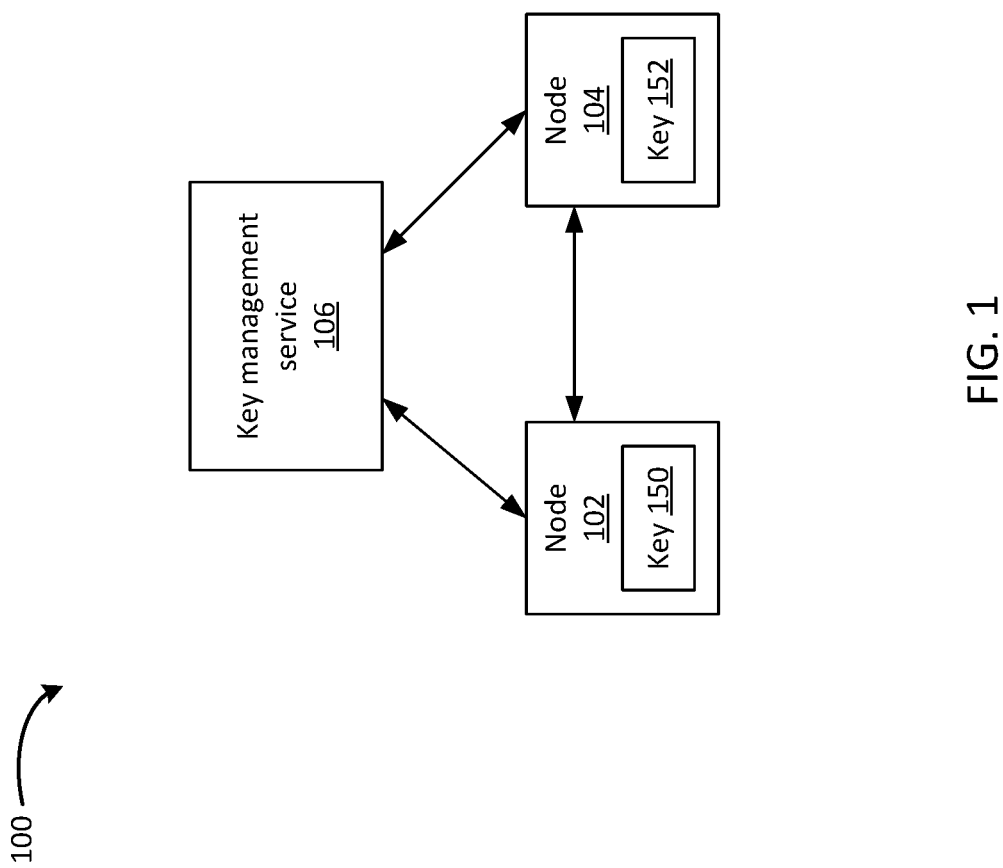
FIG. 1 illustrates a block diagram of a computer system, according to one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

In a mesh network, each node of the mesh network can transmit encrypted messages to other nodes in the mesh network. A node stores a key that can be used by the node to encrypt messages transmitted to other nodes and to decrypt messages received from other nodes. For example, in an infrastructure including power meters that measure power supplied to various clients, each power meter node can measure power delivered by the power meter over a period and can communicate the information, via encrypted communications, to other nodes for aggregation and transmission to a power utility or provider. A key management service operating in conjunction with the mesh network can periodically distribute (e.g., push) keys to the nodes in the mesh network, thus ensuring that the nodes can communicate with each other with encrypted communications.

A drawback with these mesh networking scenarios is that some nodes may be behind in getting updated keys from the key management service. For example, network conditions may hinder a node receiving a key update. When this happens, the node can be using an outdated (e.g., out of date, expired, not in current use in the network) key to encrypt and/or decrypt communications with a second node. If the second node is using an up-to-date key to communicate with the node, then the communications would fail because the node would be unable to decrypt the communications from the second node. Additionally, if the node is using an outdated key to communicate with the second node, then that communication would fail because the second node would be unable to decrypt the communication that was encrypted by the node with the outdated key.

As discussed below, a solution to the above problems is to detect, at a node, an outdated key stored at the node or at another node. A transmitting node transmits a message and a version identifier of a key used to encrypt the message to a receiving node. The receiving node receives the message and version identifier, and compares the received version identifier with a version identifier of a key that could be used by the receiving node to decrypt the message. Based on the comparison, the receiving node can determine that the key that could be used to decrypt the message is outdated or that the key used to encrypt the message is outdated in various embodiments. Respectively in response, the receiving node can request a key update or notify the transmitting node that key used by the transmitting node is outdated.

Another drawback with these mesh networking scenarios is that nodes with outdated keys would make requests to the key management service for updated keys. If an outdated key situation is prevalent throughout the mesh network, the frequent requests to the key management service would consume network bandwidth within the mesh network and would overload the key management service with requests for updated keys.

As further discussed below, a solution to the above problems is to perform, by a node, a key mismatch resolution in response to a failure associated with a key stored at the node, thereby regulating the timing and frequency of key update requests. In response to detection of a key failure associated with a key, the node determines whether a key failure counting period has been entered. If so, the node can increment a failure counter for counting failures associated with the key. If the counter meets or exceeds a threshold value and a time period for requesting key updates has been entered, then the node makes a request for a key update.

At least one technical advantage of the disclosed techniques is that, with the disclosed techniques, nodes in a network can easily identify outdated encryption keys that are still in use in the network. Accordingly, outdated keys can be replaced with new keys in a timely manner. This keeps the nodes up to date with respect to messaging security, thus improving the communication security of the network. Further, timely updating keys reduces wasted bandwidth within the network by nodes communicating encrypted messages that cannot be decrypted by the receiving nodes. Another technical advantage of the disclosed techniques is that, with the disclosed techniques, by controlling the conditions under which a node is allowed to request an updated key, the number of key update requests is reduced. This reduces the network bandwidth that is consumed by key update requests. This also reduces the computational load on the key management service responsible for distributing keys to nodes in the network.

Outdated Key Detection

Referring now to FIG. 1, a block diagram of a computer system 100 is shown. In various embodiments, computer system 100 includes, without limitation, a node 102, a node 104, and a key management service 106. As discussed in additional detail in reference to FIGS. 2A-2B, in various embodiments nodes 102 and node 104 are nodes of a mesh network that are operable to communicate with each other and other nodes in the mesh network. In various embodiments, key management service 106 is implemented by a server-based system (e.g., a cloud system) in communication with the mesh network or by a node of the mesh network. Node 102 is operable to send and receive information to and from node 104 and key management service 106. Node 104 is operable to send information to and from node 102 and key management service 106. Node 102 is operable to store a key 150, and node 104 is operable to store a key 152. In some embodiments, node 102 is operable to store multiple keys, and node 104 is operable to store multiple keys. According to the techniques discussed below in further detail in reference to FIGS. 2A-2B, nodes 102 and 104 are operable to communicate with one another using keys 150 and 152, respectively, and to resolve instances in which keys 150 and key 152 do not match.

Figure 2A:
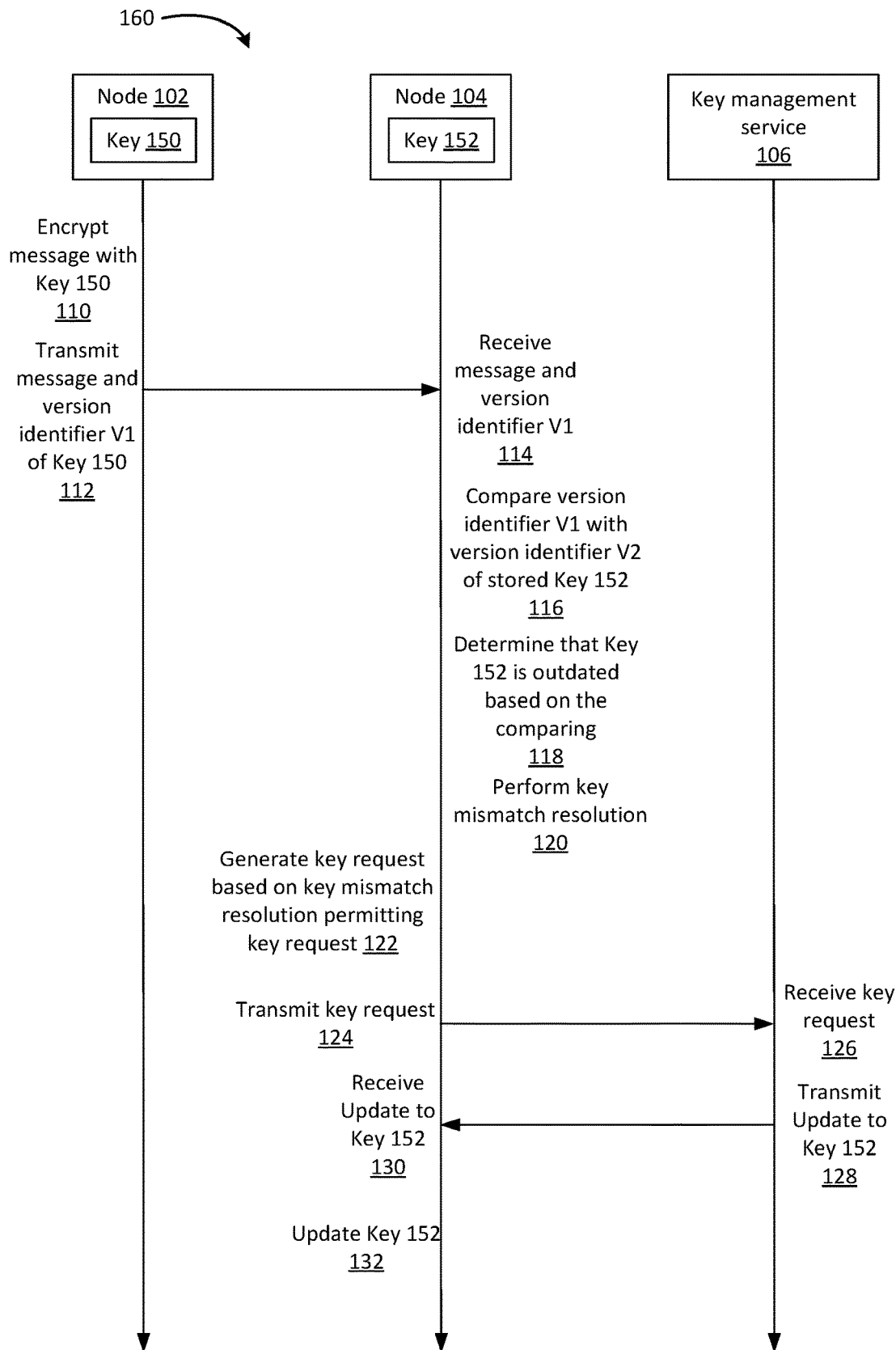
FIG. 2A illustrates an example flow diagram showing detection of an outdated key by a node in a mesh network, according to one or more aspects of the various embodiments.

FIG. 2A illustrates an example sequence diagram showing a process 160 for a node in a mesh network to detect an outdated key and to receive a key update, according to one or more aspects of the various embodiments. Although the interactions between two nodes and a key management service are shown in an order, persons skilled in the art will understand that the interactions may be performed in a different order, interactions may be repeated or skipped, and/or may be performed by components other than those described in FIG. 1.

As shown in FIG. 2A, node 102 and node 104 of a mesh network are connected by communication medium (not shown). The communication medium can be, for example, a wired connection (e.g., an Ethernet connection or a power line communication connection) or a wireless connection (e.g., a Wi-Fi connection or a Bluetooth connection). Although not shown, node 102 and node 104 can be in communication with other nodes of the mesh network by the same communication medium or different communication media. Both node 102 and node 104 are configured to execute a communication application (e.g., a software agent) that perform functions such as (without limitation) encrypting, transmitting, receiving, and/or decrypting communications (e.g., messages) to/from other nodes (e.g., with each other). Also, node 102 and node 104 are configured to execute a key management application that enables the node 102 and node 104 to detect an outdated key stored at the node or at another node and to perform key management operations in response.

As shown, process 160 begins at step 110, in which node 102 encrypts a message to be transmitted to node 104 using key 150 stored at node 102. At step 112, node 102 transmits the encrypted message and a version identifier (referred to below as "V1") of key 150 to node 104. In some embodiments, the version identifier is included in a header of the encrypted message. In some embodiments, the version identifier is transmitted in the clear (i.e., not encrypted). For example, the header of the encrypted message could be unencrypted, and the version identifier would accordingly be unencrypted if included in the header.

In some embodiments, the version identifier of a key is a version timestamp associated with the key (e.g., a key generation or derivation time, a key issue time, a key assignment time). In some embodiments, the version identifier of a key is a monotonically increasing version number (e.g., a monotonically increasing integer). More generally, the version identifier for a key is set by a key management service (e.g., key management service 106) that provides the key and updates thereof to nodes in the mesh network. The version identifier is received from the key management service by a node along with an updated key. Further, in some embodiments, the version identifier is a distinct identifier from a key identifier of the key. The key identifier of a key distinguishes a key from other keys (e.g., a key for communication with a set of nodes versus a key for communication with another set of nodes), while a version identifier distinguishes between versions of a key with the same key identifier. In some embodiments, a node is operable to store multiple keys for use, and those multiple keys are identified by the key identifier.

At step 114, node 104 receives the message and version identifier V1 from node 102. At step 116, node 104 compares version identifier V1 of key 150 with version identifier V2 of key 152 stored at node 104. In some embodiments, the comparison includes, determining which of V1 or V2 indicates a newer version of the key (e.g., which key has a later timestamp and/or a larger version identifier number), with the older version of the key being determined to be outdated. Based on the comparing, node 104 can determine that either key 150 or key 152 is outdated. A situation where node 104 determines that key 150 is outdated based on V2 indicating a newer version is described below with reference to FIG. 2B.

At step 118, node 104 determines, based on the comparison showing that V1 indicates a newer version, that key 152 is outdated. At step 120, in response to determining that key 152 is outdated, node 104 performs key mismatch resolution for key 152. The key mismatch resolution blocks generation and/or transmission of a key request (e.g., a key update request for key 152) until one or more conditions are met. In some embodiments, the conditions include that a number of failures associated with key 152 (e.g., determination that key 152 is outdated, decryption failures using key 152) is at least a minimum number, and that a current time is in a time period that permits key requests. In some embodiments, the key mismatch resolution is performed to control the timing (e.g., generation and/or transmission) of the key request.

At step 122, node 104 generates a key request based on the key mismatch resolution permitting a key update request to be made. At step 124, node 104 transmits the key update request to a key management service 106.

In various embodiments, key management service 106 is a server-based (e.g., cloud-based) system that manages keys for one or more nodes in a mesh network. Functionality performed by key management service 106 includes distributing (e.g., pushing or otherwise transmitting) keys to nodes in a mesh network periodically and/or response to key update requests, and validating keys stored at node to confirm that those keys do not need updating yet. In particular, key management service 106 distributes a key and updates thereto to nodes in the mesh network, so that the nodes can have the same version of the same key for use in secure communications with each other. In some embodiments, key management service 106 can be hosted or otherwise executed on a node in the mesh network (e.g., node 102 or 104 or a third node).

At step 126, key management service 106 receives the key request from node 104. At step 128, in response to the key request, key management service 106 transmits an update to key 152 (e.g., updated version of key 152) to node 104. At step 130, node 104 receives the update to key 152 from key management service 106. At step 132, node 104 updates key 152 (e.g., replaces key 152 with the updated version).

Figure 2B:
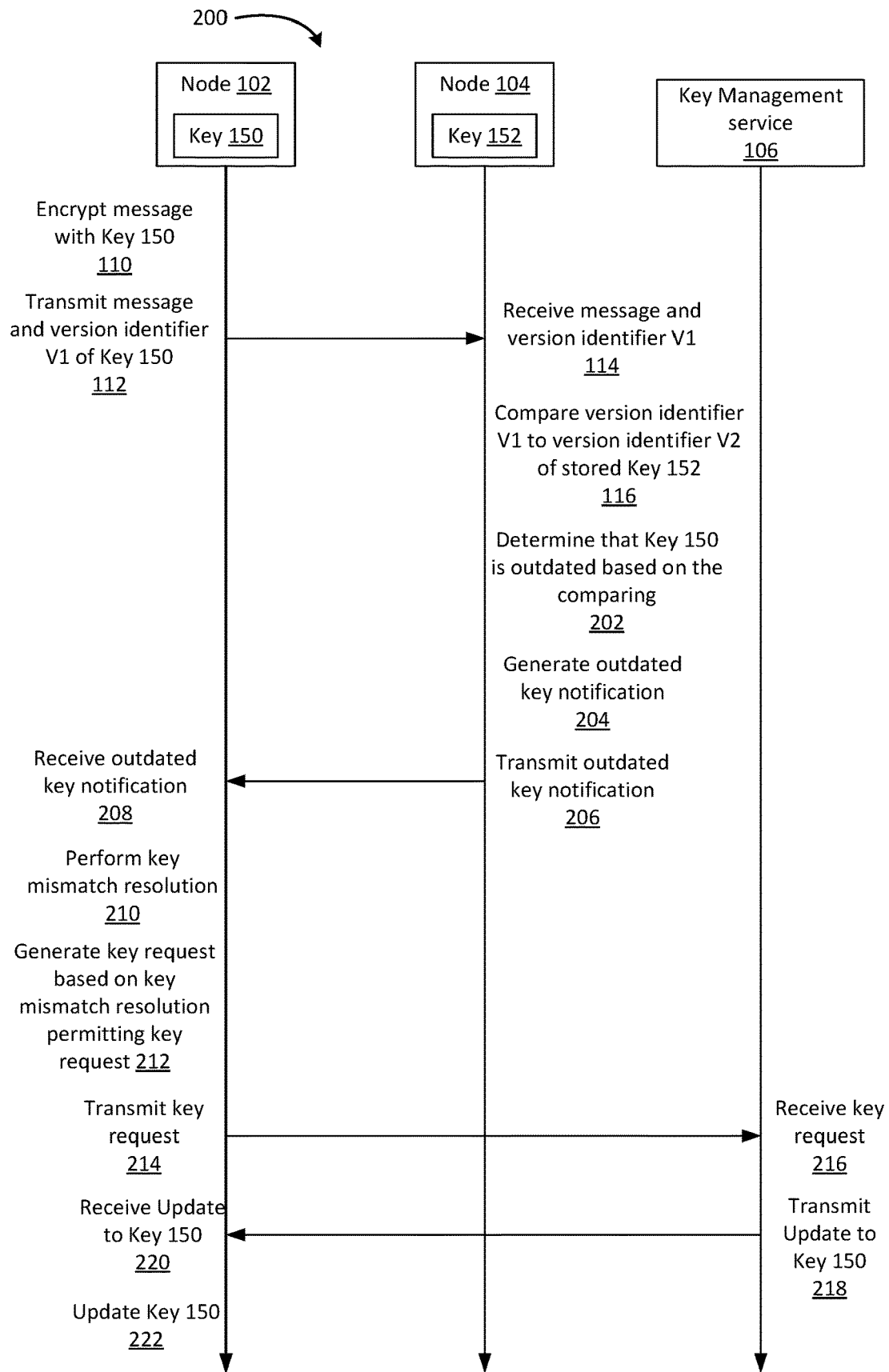
FIG. 2B illustrates another example flow diagram showing detection of an outdated key by a node in the mesh network, according to one or more aspects of the various embodiments.

FIG. 2B illustrates another example flow diagram showing a process 200 of detecting an outdated key by a node in the mesh network, according to one or more aspects of the various embodiments. As described above, FIG. 2B illustrates a situation in which node 104 determines that key 150 is outdated based on V2 indicating a newer version.

As shown, process 200 includes steps 110-116, which are described above with reference to process 160, and those descriptions are not repeated here. At step 202, based on the comparing in step 116, node 104 determines that key 150 is outdated (i.e. V2 indicates a newer version). At step 204, in response to the determination at step 202, node 104 generates an outdated key notification. In some embodiments, the outdated key notification is an acknowledgement to the message transmitted by node 102, where the acknowledgement includes information indicating that key 150 is outdated. The acknowledgement can include the key identifier and version identifier V1 of key 150, and optionally include other information indicating that key 150 is outdated (e.g., a bit flag). In some other embodiments, acknowledgement includes the key identifier and version identifier V2 of key 152, and optionally include other information indicating that key 152 is a newer key than key 150.

At step 206, node 104 transmits the outdated key notification to node 102. At step 208, node 102 receives the outdated key notification. At step 210, in response to receiving the outdated key notification indicating that key 150 is outdated, node 102 performs key mismatch resolution for key 150. The key mismatch resolution blocks generation and/or transmission of a key request (e.g., a key update request for key 150) until one or more conditions are met. In some embodiments, the conditions include that a number of failures associated with key 150 (e.g., determination that key 150 is outdated, decryption failures using key 150) is at least a threshold, and that a current time is in a time period that permits key requests. In some embodiments, the key mismatch resolution is performed to control the timing (e.g., when to generate and/or transmit) of the key request.

At step 212, node 102 generates a key request based on the key mismatch resolution permitting a key request to proceed. At step 214, node 102 transmits the key request to a key management service 106. As in process 160 above, the key mismatch resolution is performed to modulate the timing (e.g., generation and/or transmission) of the key request.

At step 216, key management service 106 receives the key request from node 102. At step 218, in response to the key request, key management service 106 transmits an update to key 150 (e.g., updated version of key 150) to node 102. At step 220, node 102 receives the update to key 150 from key management service 106. At step 222, node 102 updates key 150 (e.g., replaces key 150 with the updated version).

Figure 3A:
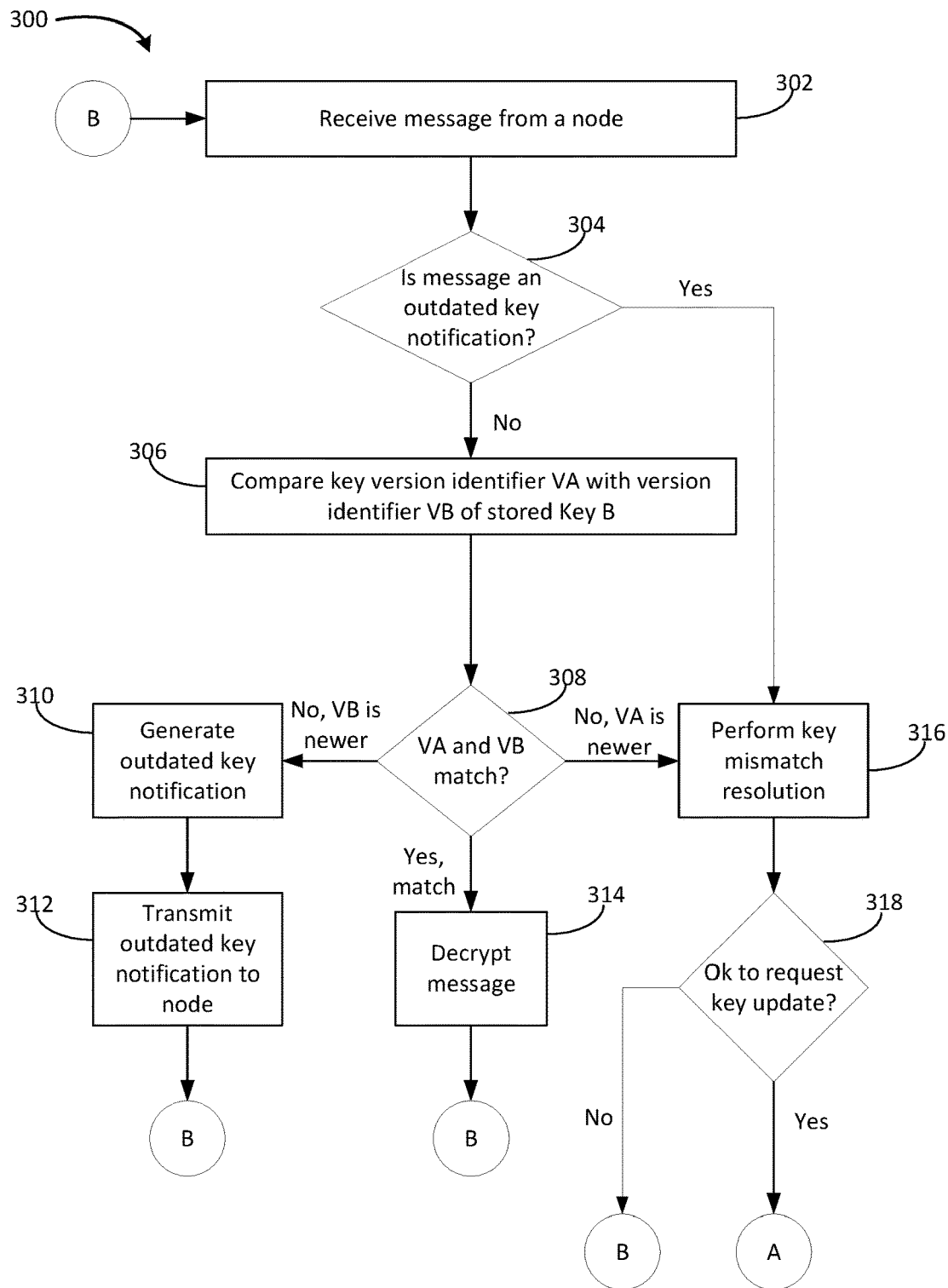
FIGS. 3A-3B illustrate a flow diagram of method steps for detecting an outdated key, according to one or more aspects of the various embodiments.
Figure 3B:
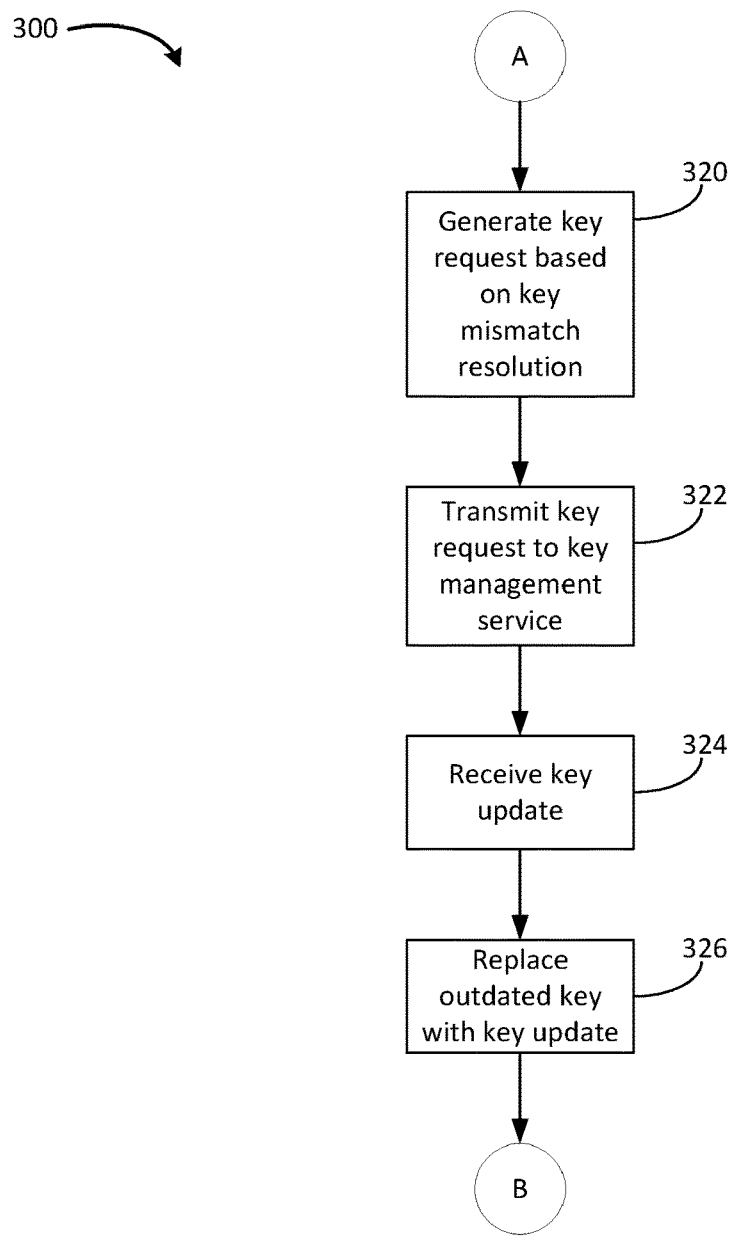

FIGS. 3A-3B illustrate a flow diagram of method steps for detecting an outdated key, according to one or more aspects of the various embodiments. The method steps of FIGS. 3A-3B can be performed, for example, by node 102 or node 104 of FIGS. 1-2B. At least some of the method steps of FIGS. 3A-3B can be performed, for example, during the processes 160 or 200 of FIGS. 2A and 2B, respectively.

As shown, a method 300 begins at step 302, in which a first node (e.g., a communication application at the first node) receives a message from a second node. The message can be encrypted by the second node using a Key A, which is stored at the second node. If the message is encrypted by the second node, a key version identifier ("VA") of Key A accompanies the message (e.g., in a message header). For example, in processes 160 and 200, at step 114, node 104 receives an encrypted message. Node 104 also receives, along with the encrypted message, a version identifier of the key used by node 102 to encrypt the message. In some embodiments, the message is an outdated key notification for the key stored at the first node.

At step 304, if the message is an outdated key notification (304—Yes), then method 300 proceeds to step 316, further described below. At step 304, if the message is not an outdated key notification (304—No), then method 300 proceeds to step 306. At step 306, the first node (e.g., a key management application at the first node) compares key version identifier VA with the key version identifier VB of a key ("Key B") stored at the first node, to determine if VA and VB match, and if not, which one indicates a newer key. For example, in processes 160 and 200, at step 116, node 104 compares version identifiers V1 and V2 of key 150 and key 152, respectively.

At step 308, if VA and VB do not match, and VB indicates that Key B is newer than Key A (308—No, VB is newer), then method 300 proceeds to step 310, where the first node generates an outdated key notification. At step 312, the first node transmits the outdated key notification to the second node. For example, in process 200, at steps 204-206, node 104 generates an outdated key notification and transmits the notification to node 102. Method 300 then returns to step 302, where the first node can receive another message.

At step 308, if VA and VB match, thereby indicating that Key A and Key B are the same version (308—Yes, match), then method 300 proceeds to step 314, where the first node can proceed to decrypt the message received from the second node using Key B, which is determined to be the same version as Key A that was used to encrypt the message. Method 300 then returns to step 302, where the first node can receive another message.

At step 308, if VA and VB do not match, and VB indicates that Key A is newer than Key B (308—No, VA is newer), then method 300 proceeds to step 316, where the key management application at the first node performs a key mismatch resolution for Key B. The key management application performs the key mismatch resolution in response to an outdated key notification for Key B in step 304 or a determination that Key B is outdated (e.g., Key A is newer than Key B) in step 308. The key mismatch resolution controls the timing of key update requests by checking one or more conditions which, if met, would trigger generation and/or transmission of a key update request. The key mismatch resolution would block generation and/or transmission of the key update request (e.g., for Key B at step 316) until the conditions are met. In some embodiments, the conditions include, at least, that a failure count associated with the key be at least a threshold and that at least a threshold amount of time has elapsed since the last time the key was updated. Key mismatch resolution and associated conditions are further described below with reference to FIGS. 5-7.

At step 318, if the key mismatch resolution does not permit a request for a key update (318—No), then method 300 returns to step 302, where the first node can receive another message. The key mismatch resolution determines that the conditions for a key request have not been met, and accordingly prevents a key update request for Key B at the current time. The conditions may be met after further iterations of steps 302-308 and 316. At step 318, if the key mismatch resolution permits a request for a key update (318—Yes), then method 300 proceeds to step 320.

At step 320, the first node generates a key request based on the key mismatch resolution permitting a request. If the key mismatch resolution permits a key request based on the associated conditions being met, then the key management application generates a key request for a key update to replace the outdated Key B. In some embodiments, key mismatch resolution can be bypassed or otherwise omitted, such that a key request is generated in response to the determination that Key B is outdated without the additional conditions associated with the key mismatch resolution.

At step 322, the first node transmits the key update request to the key management service (e.g., key management service 106). At step 324, the first node receives an updated key from the key management service. At step 326, the first node replaces Key B with the updated key. For example, similar to steps 124 and 130-132 in process 160, node 104 transmits a key request, receives an updated key (update to key 152) from the key management service, and replaces the outdated key (key 152) with the updated key (e.g., update to key 152). Method 300 then returns to step 302, where the first node can receive another message.

Key Management and Key Mismatch Resolution

Figure 4:
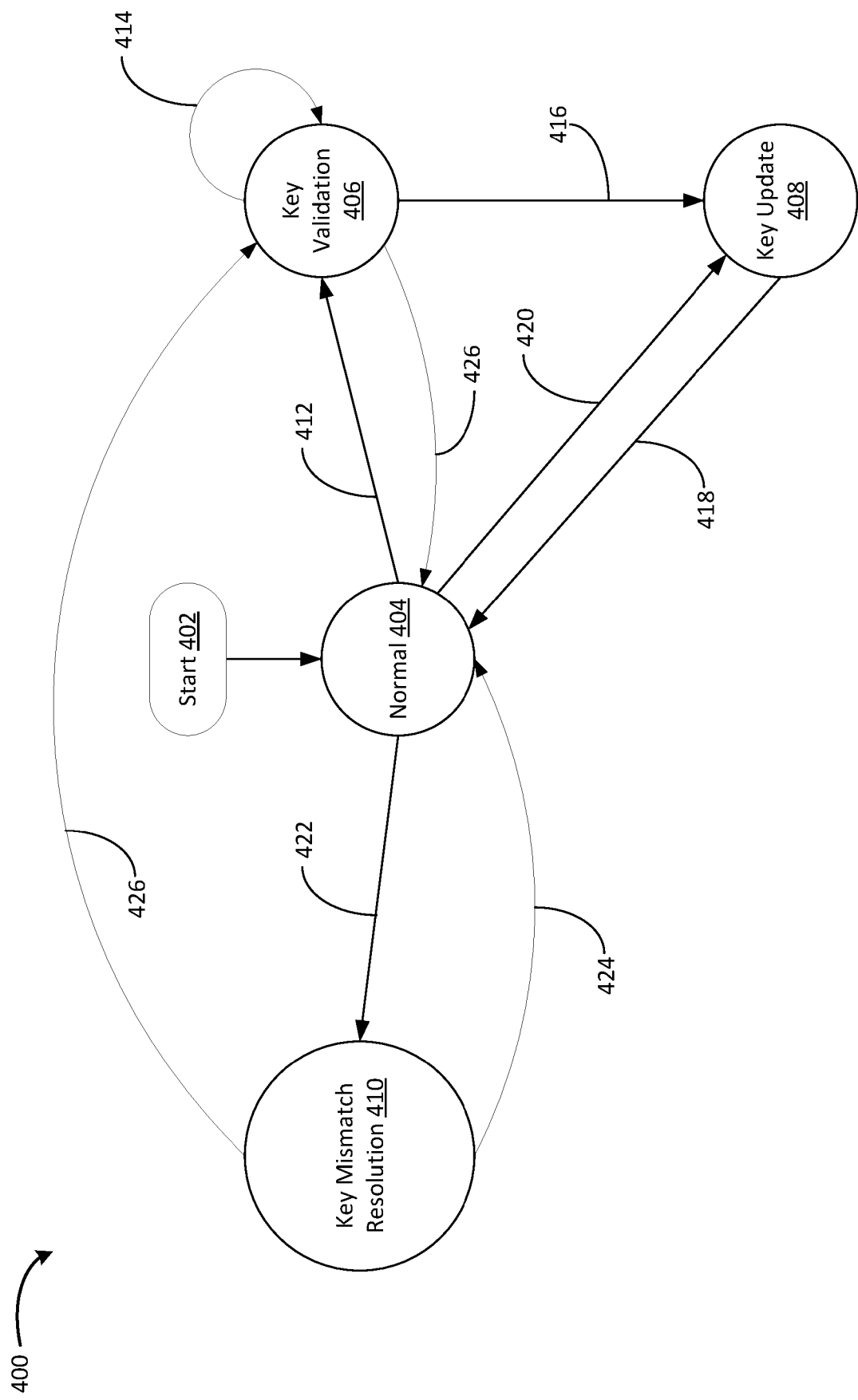
FIG. 4 illustrates a state diagram of a key management scheme at a node, according to one or more aspects of the various embodiments.

As described above, a node can perform key mismatch resolution in response to a determination that a key stored at the node is outdated. FIG. 4 illustrates a state diagram 400 of a key management scheme at a node, according to one or more aspects of the various embodiments. State diagram 400 illustrates the various states (e.g., modes of operation) associated with the key management scheme that is implemented at a node (e.g., nodes 102 and 104) within the mesh network. Operations associated with state diagram 400, described below, can be performed by a key management application at the node.

As shown, state diagram 400 begins at a start state 402, which is where the key management application begins upon the node starting up. The key management application automatically transitions from start state 402 to a normal state 404.

At normal state 404, the key management application derives a default key using shared secret data. In some embodiments, the shared secret data can be secret data that is known only to the nodes in the mesh network. The shared secret data can be provided to (e.g., installed or stored into) the nodes at manufacturing or deployment. The key management application can derive the default key from the shared secret data using any technically feasible key derivation technique. In some embodiments, the key management application derives a default key if a default key does not exist. If a default key is already available (e.g., had been previously derived and has not been updated or replaced yet), then the key management application can skip the default key derivation.

From normal state 404, the key management application transitions 412 to a key validation state 406. At key validation state 406, the key management application generates and transmits a key validation request for the derived default key to a key management service (e.g., key management service 106). The key validation request requests that the key management service validate the currently stored key (e.g., the default key in this case) as the up-to-date key in use for secure communications with other nodes in the mesh network (e.g., confirm that the stored key is up to date), or provide a key update to replace the currently stored key if the currently stored key is outdated. Accordingly, a key validation request is, in effect, a key update request if the key validation request is made for a key that is outdated. In various embodiments, the key validation request includes a key identifier of the default key and data representing the default key (e.g., a hash of the default key). In some embodiments, the key management application can delay transmitting the key validation request to the key management service by a random amount of time, in order that key validation requests from nodes in the mesh network to the key management service can be spread out (e.g., when multiple nodes in the mesh network are starting up). In some embodiments, the key management application transitions from normal state 404 to key validation state 406 after a default key derivation, which is caused by the startup of the node if the startup is a power-on reset or restart (as opposed to resets or restarts for certain other reasons, such as a reset for a firmware update).

After transmitting the key validation request, the key management application remains in key validation state 406 for a key validation wait period while waiting for a response from the key management service. If the wait times out (e.g., the key validation wait period elapses) without the node receiving a response from the key management service, the key management application resends 414 the key validation request to the key management service. In some embodiments, the key validation wait period is a configurable value. In some embodiments, the key validation response wait period is configured to be 4 hours.

When the node receives a response from the key management service, the key management application transitions from key validation state 406. If the response from the key management service is a validation of the key as the up-to-date key, then the key management application transitions 426 from key validation state 406 back to normal state 404 with the key stored at the node remaining the same.

If the response from the key management service includes data for a key update, then the key management application transitions 416 from key validation state 406 to key update state 408. In some embodiments, the response with updated key data includes the key identifier of the key update (which should be the same key identifier as the key stored at the node), the actual data of the key update, an assignment timestamp of the key update, and optionally a separate version identifier of the key update.

In some embodiments, with the derivation of a default key or the application of any key update, the key management application stores data associated with the key and sets and/or resets one or more pieces of key management data (e.g., key management data 550, described below) associated with the key. The stored key (e.g., key 848 in FIG. 8 described below) includes, without limitation, a key identifier, the actual data of the key (e.g., the value of the key), a hash of the actual data of the key, and an assignment timestamp of the key. The assignment timestamp can be, a timestamp indicating when the key was derived, generated, assigned, issued, and/or the like by the key management service. For a default key, the assignment timestamp is 0. In some embodiments, the assignment timestamp is a version identifier of the key. In some embodiments, the stored key data further includes a version identifier, separate from the assignment timestamp, that is a monotonically increasing number (e.g., a monotonically increasing integer).

At key update state 408, the key management application compares the key identifier in the key update data received from the key management service with the key identifier stored at the node to verify that the key update is for the key stored at the node. Upon verification, the key management application stores the data of the key update, a hash of the data of the key update, and the assignment timestamp of the key update. The key management application also updates key management data, including, without limitation, setting an update timestamp to the current time, resetting the first failure time to 0 and the failure counter to 0, and resetting a key validation state flag to 0. The key management application transitions 418 from key update state 408 back to normal state 404. As part of the transition 418 from key update state 408 to normal state 404, the key management application transmits a response to the key management service acknowledging the key update for the default key. The response can include the key identifier, the assignment timestamp of the updated key, and a hash of the actual data of the updated key.

As described above, the key management service periodically initiates (e.g., pushes) a key update to nodes in a mesh network. A key update initiated by the key management service can be referred to as a "key rollover" or "key rollover request." The key rollover request includes similar key data as a key update that is responsive to a key validation request; the key rollover request includes the key identifier of the key update (which should be the same key identifier as the key stored at the node), the actual data of the key update, an assignment timestamp of the key update, and optionally a separate version identifier of the key update. In response to receiving a key rollover request from the key management service, the key management application transitions 420 from normal state 404 to key update state 408. At key update state 408, the key management application stores the key data from the key rollover request and sets and/or reset key management data in a similar manner as described above with respect to a key update response to a key validation request. The key management application then transitions 418 from key update state 408 back to normal state 404. The key management application transmits to the key management service a response acknowledging the key rollover, similar to the response described above with respect to the response to the key update for the default key.

While in normal state 404, the node can receive messages from other nodes and attempt to decrypt those messages using the key stored at the node. Additionally, the node can determine whether the key stored at the node or the key used to encrypt a message is outdated using the techniques described above with reference to FIGS. 1-3. When the node (e.g., with the key management application) determines or detects that its stored key has a failure, then the key management application transitions 422 from normal state 404 to key mismatch resolution state 410. As used herein, a failure of a key includes a failure in an attempt to decrypt a message using the key, a determination that the key is outdated based on a comparison of version identifiers (the outdated key is expected to fail in decrypting the message), and/or a receipt of an outdated key notification for the key from another node (the outdated key would fail in decrypting messages from the another node). In some embodiments, other failures of the key are possible and can be detected (e.g., if the data corresponding to the key is corrupted, the key has been compromised).

At key mismatch resolution state 410, the key management application determines whether the failures associated with the key and/or a timing associated with the failures permit the node to enter key validation state 406 to make a key update request. If the key management application determines, based on the key mismatch resolution, that the failures associated with the key do not yet permit making a request for a key update, then the key management application transitions 424 back to normal state 404 while maintaining certain key management data for use in the key mismatch resolution. If the key management application determines, based on the key mismatch resolution, that that a request for a key update can be made, then the key management application transitions 426 to key validation state 406. At key validation state 406, the key management application generates a key validation request for the stored key and transmits the key validation request to the key management service and receives a response, following transitions through key validation state 406 and key update state 408 in a manner similar to that described above with respect to a key validation request for a default key.

Figure 5:
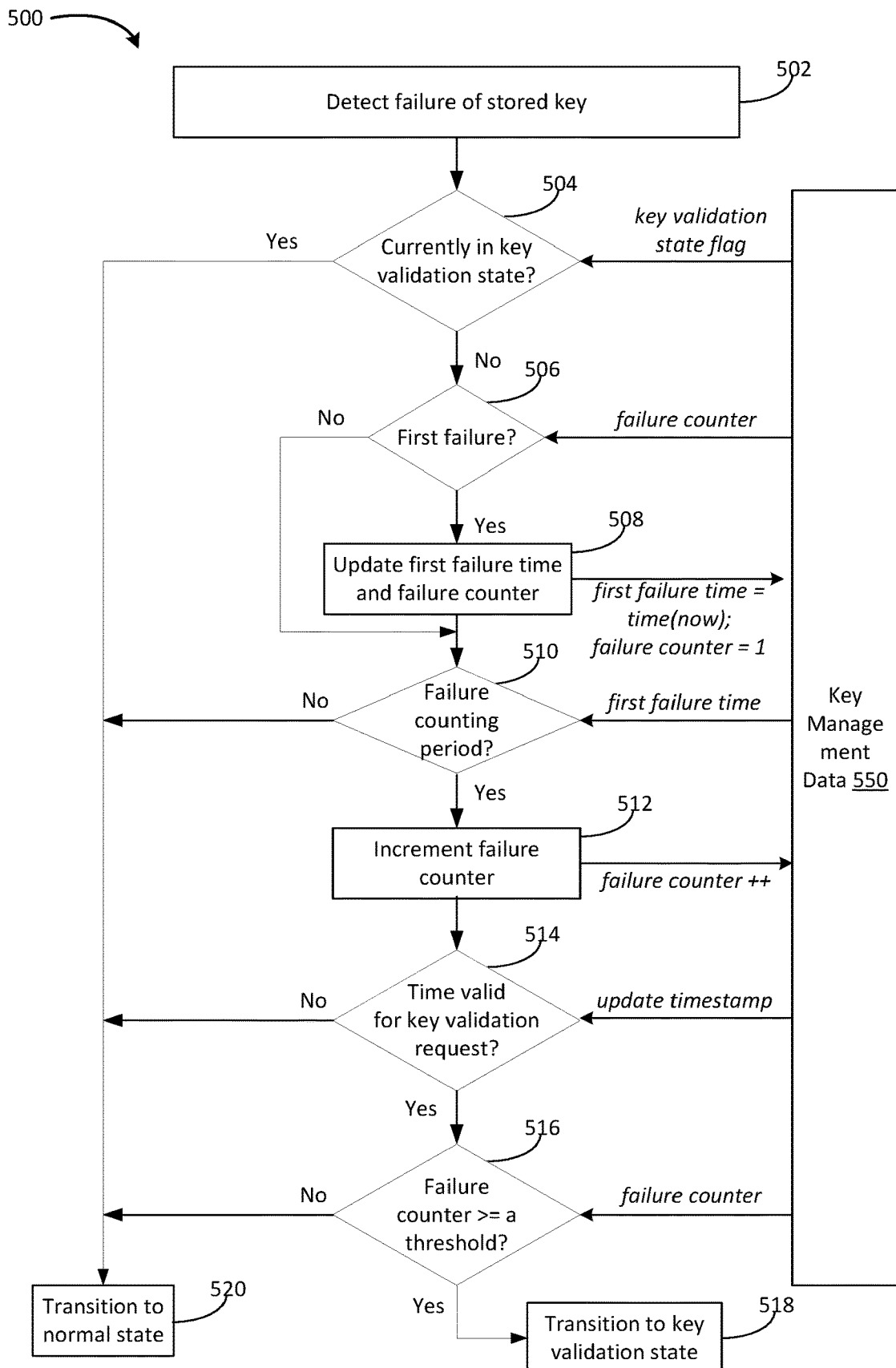
FIG. 5 illustrates a flow diagram for key mismatch resolution method, according to one or more aspects of the various embodiments.

FIG. 5 illustrates a flow diagram for a key mismatch resolution process 500, performed in key mismatch resolution state 410, according to one or more aspects of the various embodiments. The flow diagram in FIG. 5 illustrates logic and data processing included in key mismatch resolution process 500 to determine whether a node is permitted to request a key update. It should be appreciated that key mismatch resolution process 500, as shown in FIG. 5, is applied separately for each key. Also, as shown in FIG. 5, the logic and operations performed in key mismatch resolution process 500 read information from and write information to key management data 550.

Key management data 550 includes, without limitation, the key identifier of the current key at the node, an update timestamp indicating when the key was last validated or updated (e.g., when the preceding key is replaced with the current key at the node, when the key was last validated by the key management service), a key validation state flag indicating whether the key management application is in key validation state 406, a first failure time, and a failure counter. The first failure time and the failure counter are further described below. The key validation state flag is set to 1 (true) whenever the key management application enters key validation state 406 from another state and is reset to 0 (false) whenever the key management application exits key validation state 406. More generally, the key management data includes information that are used to manage the key at the node, as opposed to being the key itself. The key management data can include counters, timestamps, identifiers, status and/or state indicators or flags, and/or the like.

As shown, key mismatch resolution process 500 begins at step 502, where the key management application detects a failure of the key stored at the node. As described above, the key management application transitions 422 from normal state 404 to key mismatch resolution state 410, in which process 500 is performed, when a failure of the key is detected. The key management application can detect a failure by detecting a failure in a decryption attempt at the node using the key, detecting that the data corresponding to the key is corrupted, detecting that the key has been compromised, determining that the key is outdated based on a comparison of version identifiers, or by receiving an outdated key notification for the key from another node.

At step 504, the key management application checks if it is already in key validation state 406 (e.g., a key validation request is in progress or otherwise pending) based on the key validation state flag in key management data 550. If the key management application is already in key validation state (504—Yes), then process 500 proceeds to step 520. At step 520, key mismatch resolution state 410 ends with no key update requested, and the key management application transitions 424 back to normal state 404.

If the key management application is not in key validation state 406 (510—No), then process 500 proceeds moves to step 506, where the key management application checks if the failure detected at step 502 is a first failure to be counted by checking if the failure counter in key management data 550 is zero or non-zero. If the failure counter is non-zero (i.e., 1 or greater) (506—No), then process 500 proceeds to step 510, bypassing step 508.

If the failure counter is zero and thus the detected failure is a first failure to be counted, (506—Yes), then process 500 proceeds to step 508, where the key management application updates the first failure time and the failure counter in key management data 550. In particular, the key management application sets the first failure time to a timestamp of the detection of the failure (e.g., a timestamp of the failure, the current time corresponding to when the failure is detected) and sets the failure counter to 1. Process 500 then proceeds to step 510.

Figure 6:
FIG. 6 illustrates a timeline diagram of a key failure detection time period, according to one or more aspects of the various embodiments.

At step 510, the key management application checks if a time to count failures has started by checking if a certain amount of time has elapsed since the first failure time. FIG. 6 illustrates a timeline diagram 600 of a key failure detection time period. As shown in FIG. 6, timeline diagram 600 includes a first failure time 602. A configurable parameter value, referred to herein as the "key rollover try period," sets a maximum time period, starting from a first failure time, allowed for key rollovers initiated by the key management service (including any retries thereof) to complete before the node is permitted to generate and/or transmit a key validation request. In some embodiments, the key rollover try period is configured to be seventy-two hours. Another configurable parameter value, a failure counting period, sets a time period at the latter part of the key rollover try period during which process 500 can count detected failures and update the failure counter accordingly. In some embodiments, the failure counting period is configured to be twelve hours back from the end of the key rollover try period.

As shown in timeline diagram 600, a time period, the length of which is the key rollover try period, extends from first failure time 602 to a time 606. A time period, the length of which is the failure counting period, extends from a time 604 to time 606. Between times 602 and 604, detected failures of the stored key are not counted (e.g., the failure counter is not updated). Between times 604 and 606, detected failures of the key are counted and the failure counter is updated accordingly (e.g., incremented by one for each detected failure). The time period between times 604 and 606 can be considered to be a key failure detection time period. Prior to this key failure detection time period (e.g., between times 602 and 604), failures are detected but those detected failures are not counted in order to give key rollovers initiated by the key management service an opportunity to complete. During the key failure detection time period, failures that are detected are counted in the failure counter toward permission for the node to make a key update request.

Returning to FIG. 5 and step 510, if the current time is prior to the failure counting period (e.g., between times 602 and 604 in timeline diagram 600) (510—No), then process 500 proceeds to step 520. If the current time is within the failure counting period (e.g., between times 604 and 606 in timeline diagram 600) (510—Yes), then process 500 proceeds to step 512, where the key management application increments the failure counter by 1. Process 500 then proceeds to step 514.

At step 514, the key management application checks if the current time is valid for a key validation request by checking if enough time has elapsed since the update timestamp. Returning to FIG. 6, timeline diagram 600 shows an example current time 608. Timeline diagram 600 further shows a time period between update timestamp 610 and a time 612, whose length is a configurable time parameter value referred to herein as the "key validation blocking period." The key validation blocking period sets a minimum time period between two consecutive key validations and/or updates. If the current time is later than update timestamp 610 by at least the key validation blocking period (e.g., current time 608 is later than time 612, as shown in FIG. 6), and the key rollover try period has also elapsed (e.g., current time 608 is later than time 606), then the current time is valid for a key validation request. If the current time is still within the key validation blocking period from update timestamp 610 (e.g., current time 608 is instead between update timestamp 610 and time 612), or if the key rollover try period has not elapsed yet (e.g., current time 608 is between times 612 and 606, as shown in FIG. 6), then the current time is not valid for a key validation request; the key management service is blocked from generating and/or transmitting a key validation request. In some embodiments, the key validation blocking period is configured to be seventy-two hours. Thus, after the key validation blocking period has elapsed at time 612 and the key rollover try period has elapsed at time 606, the key management application enters into a key update time period, during which the key management application is permitted to generate and/or transmit a key validation request.

In some embodiments, the key validation blocking period, the key rollover try period, the key validation wait period, and the failure counting period parameter values are configurable based on one or more factors, including but not limited to a size of the mesh network (e.g., number of nodes), a communication reliability within the mesh network (e.g., connection quality within the mesh network), latency between the key management service and nodes within the mesh network, a rate at which the key management service initiates key rollovers (e.g., a key rollover frequency or interval), an acceptable load at the key management service for handling key update requests and/or the like. More generally, these parameter values can be configured based on an estimation of the time needed for a key rollover to complete across the mesh network, given a size of the mesh network. It should be appreciated that while example values are provided for these parameters above, different values are possible based on the above-described factors and/or other factors.

Returning to FIG. 5 and step 514, if the current time is not valid for a key validation request (514—No), then process 500 proceeds to step 520. If the current time is valid for a key validation request (514—Yes), then process 500 proceeds to step 516, where the key management application checks if the failure counter is equal to or greater than a threshold (e.g., a minimum failure count). In some embodiments, the minimum failure count is a configurable parameter value. In some embodiments, the minimum failure count is configured to be twelve. It should be appreciated that while an example value is provided for the minimum failure count, different values are possible.

If the failure counter is less than the minimum failure count (516—No), then process 500 proceeds to step 520. If the failure counter is equal to or greater than the minimum failure count (516—Yes), then process 500 moves to step 518, where the key management application begins key validation by transitioning 426 to key validation state 406 and sets and/or resets data in key management data 550. In some embodiments, the key management application resets the update timestamp to 0, resets the first failure time to 0, resets the failure counter to 0, and sets the key validation state flag to 1 (e.g., true). With the transition 426 to key validation state 406, process 500 ends. At key validation state 406, the key management application generates and transmits to the key management service a key validation request for the stored key.

Figure 7:
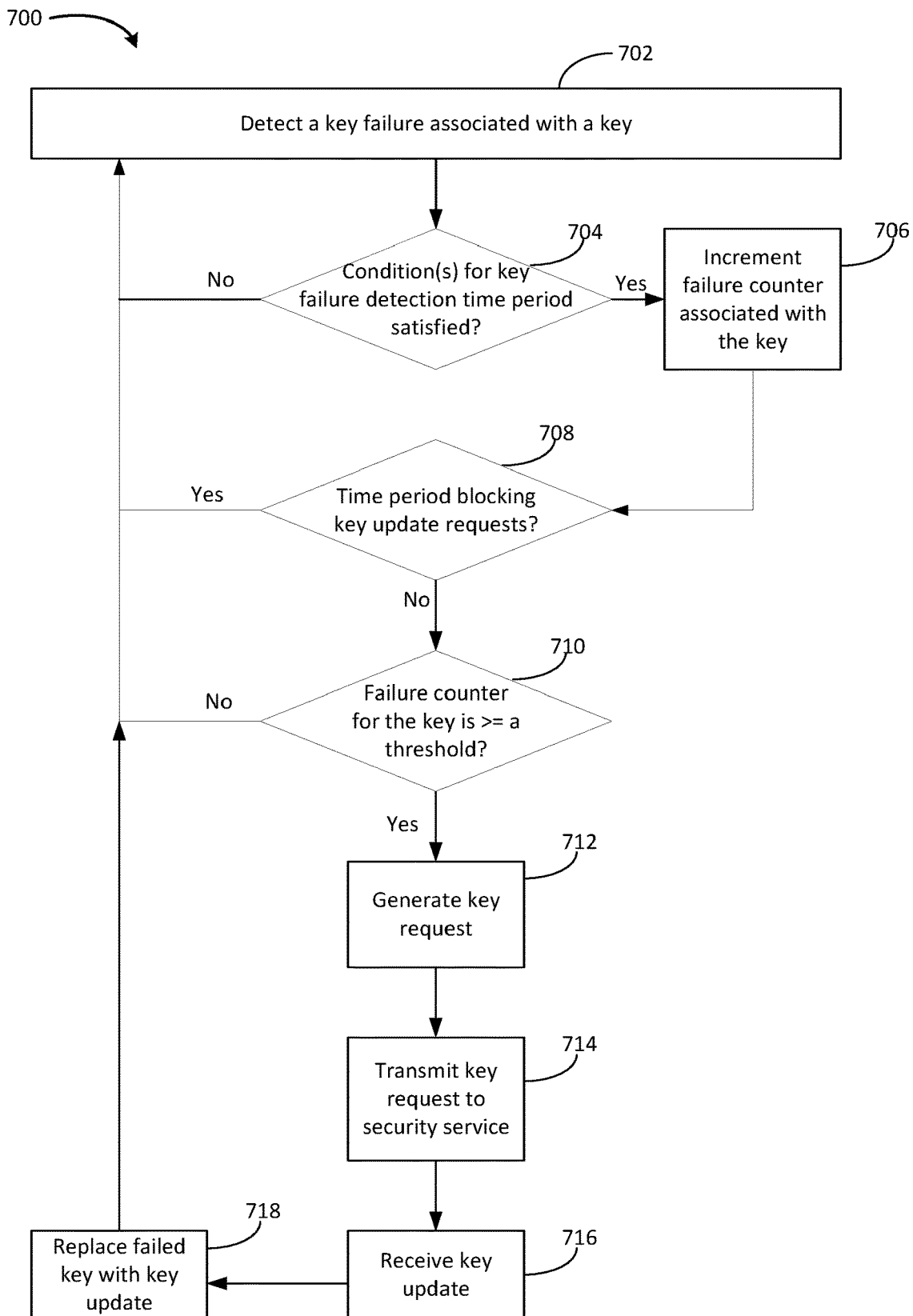
FIG. 7. Is a flow diagram of method steps for updating a key, according to one or more aspects of the various embodiments.

FIG. 7. Is a flow diagram of method steps for updating a key, according to one or more aspects of the various embodiments. The method steps of FIG. 7 can be performed, for example, by node 102 or node 104 of FIGS. 1-2. At least some of the method steps of FIG. 7 can be performed, for example, within the key management scheme represented by state diagram 400 of FIG. 4 and/or during key mismatch resolution process 500 of FIG. 5.

As shown, method 700 begins at step 702, where a key management application detects a key failure associated with a key. The key management application at a node detects a failure of a key stored at the node. The failure can be detected via detecting a failed decryption attempt and/or via the techniques described above in conjunction with FIGS. 1-3 (e.g., comparing version identifiers, receiving an outdated key notification). For example, the key management application transitions 422 to key mismatch resolution state 410 in response to detecting the failure.

At step 704, the key management application determines whether one or more conditions for a key failure detection time period are satisfied. The conditions can include that the current time is in a failure counting period for the key (e.g., after a first failure time and in a latter portion of a key rollover try period corresponding to the failure counting period), and that the failure is not the first counted failure for the key. For example, the key management application performs a check for whether the failure counter is non-zero and whether the current time is in a failure counting period, similar to steps 506 and 510 in process 500. If the condition(s) are not satisfied (704—No), then method 700 returns to step 702, where the key management application can detect another failure associated with the key.

If the conditions are satisfied (704—Yes), then method 700 proceeds to step 706, where key management application increments a failure counter associated with the key. For example, the key management application increments the failure counter for a detected failure, similar to step 512 in process 500.

At step 708, the key management application determines whether the current time is in a time period that blocks key update requests. If the current time is within a key validation blocking period since the last time the key is updated (e.g., the update timestamp), or the key rollover try period has not elapsed yet, the key management application is blocked from generating and/or transmitting key update requests (e.g., key validation requests) by the node. For example, referring to timeline diagram 600, the key management application checks whether the current time is within the key validation blocking period between update timestamp 610 and time 612 and whether the key rollover try period has elapsed yet, similar to step 514 in process 500.

If the current time is in a time period that blocks key update requests (708—Yes), then method 700 returns to step 702, where the key management application can detect another failure associated with the key. If the current time is in a time period that does not block (that is, is valid for) key update requests (708—No), then method 700 proceeds to step 710, where the key management application determines whether the failure counter for the key is equal to or greater than a threshold (e.g., a minimum failure count). For example, the key management application compares the value of the failure counter to the value of the minimum failure counter, similar to step 516 in process 500.

If the failure counter is not equal to or greater than the threshold (710—No), then method 700 returns to step 702, where the key management application can detect another failure associated with the key. If the failure counter is equal to or greater than the threshold (710—Yes), then method 700 proceeds to step 712, where the key management application generates a key request. The key management application transitions 426 to key validation state 406, where the key management application generates a key validation request for the stored key. At step 714, the key management application transmits the key update request (e.g., key validation request) to a key management service. At step 716, the key management application receives a key update from the key management service. At step 718, the key management application replaces the failed key with the key update. Method 700 then returns to step 702, where the key management application can detect a failure associated with the updated key.

Figure 8:
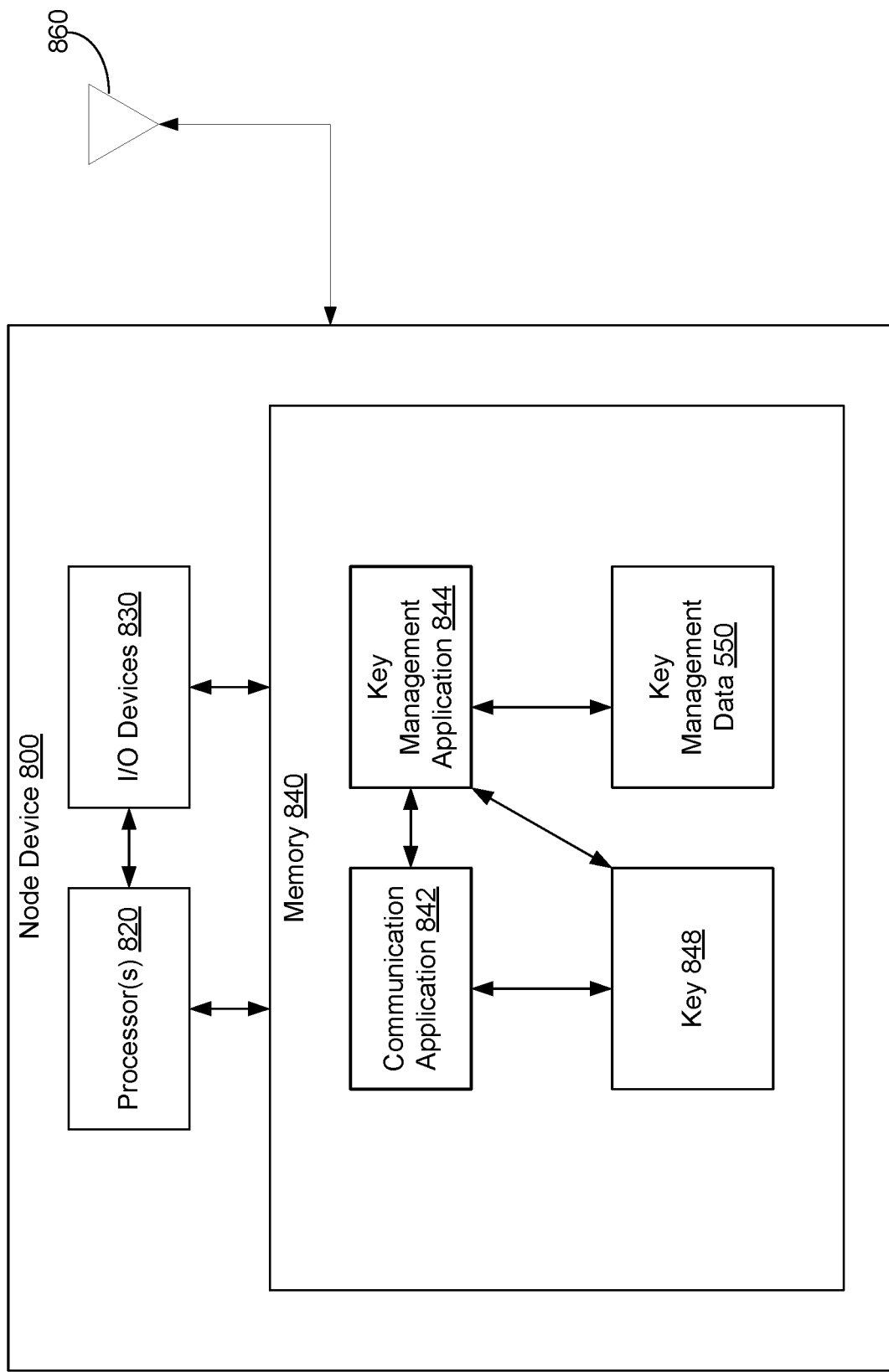
FIG. 8 illustrates an exemplary node device that can be included in a mesh network and which is configured to implement one or more aspects of the various embodiments.

FIG. 8 illustrates an exemplary node device 800 that can be included in a mesh network and used to implement the techniques discussed above with respect to FIGS. 1-7. Node device 800 includes, without limitation, one or more processors 820, one or more input/output (I/O) devices 830, one or more transceivers 860, and a memory 840.

Node device 800 is a network device and includes computing device hardware configured to perform various processing operations and execute program code. The node can further include various analog-to-digital and digital-to-analog converters, digital signal processors (DSPs), harmonic oscillators, transceivers, and any other components generally associated with RF-based communication hardware. In various embodiments, node device 800 includes a battery (not shown) that supplies power to the various computing device hardware included in node device 800.

The one or more processors 820 can include any hardware configured to process data and execute software applications. At least one of the one or more processors 820 can include a real-time clock (RTC) (not shown) according to which processor 820 maintains an estimate of the current time. At least one of the one or more processors 820 executes a communication application 842 and key management application 844.

The one or more I/O devices 830 include devices configured to receive input, devices configured to provide output, and devices configured to both receive input and provide output. In various embodiments, the one or more I/O devices include a keyboard, a mouse, a joystick, a touchpad, a touchscreen, a microphone, an inertial measurement unit (IMU), a display, a speaker, a haptic generator, or the like.

The one or more transceivers 860 can include one more interfaces that are associated with various communication media. In various embodiments, the one or more transceivers include at least one of an Ethernet interface, a power line communication interface, a WiFi® interface, or a Bluetooth® interface.

The memory 840 can be implemented by any technically feasible storage medium, including volatile and/or non-volatile storage media. Memory 840 includes, without limitation, a communication application 842 and a key management application 844. Communication application 842 includes program code that, when executed by the one or more processors 820, performs any of the communications (e.g., messages, key validation requests, notifications, acknowledgements) functionality (e.g., transmission, reception, encryption, decryption) described herein. In various embodiments, the communications functionality includes reception and transmission of messages, key validation requests, and/or the like, such as the operations described above in conjunction with FIGS. 1-7. Key management application 844 includes program code that, when executed by the one or more processors 820, performs any of the key management and key mismatch resolution functionality described herein. In various embodiments, the key management and key mismatch resolution functionality includes default key derivation, key rollovers, key failure detection, and key mismatch resolution, and/or the like, such as the techniques described above in conjunction with FIGS. 1-7 (e.g., processes 160, 200, and 500, methods 300 and 700, key management scheme associated with state diagram 400). In some embodiments, key management application 844 can perform at least some of its key management and key mismatch resolution functionality in conjunction with communication application 842 (e.g., communication application 842 transmitting key validation requests, communication application 842 informing key management application 844 of a failure to decrypt a message). In some embodiments, communication application 842 and key management application 844 can be combined.

Memory 840 further includes a key 848 and key management data 550. Key 848 includes the actual data of the key and associated key data (e.g., key identifier, version identifier, etc.). Key management data 550 includes one or more pieces of data associated with key management, including key mismatch resolution. Examples of such pieces of data include values of configurable parameters (e.g., key rollover try period, minimum failure counter, etc.), and data tracking various times and/or counts used in key management (e.g., failure count, first failure time, update timestamp, etc.).

System Overview

Figure 9:
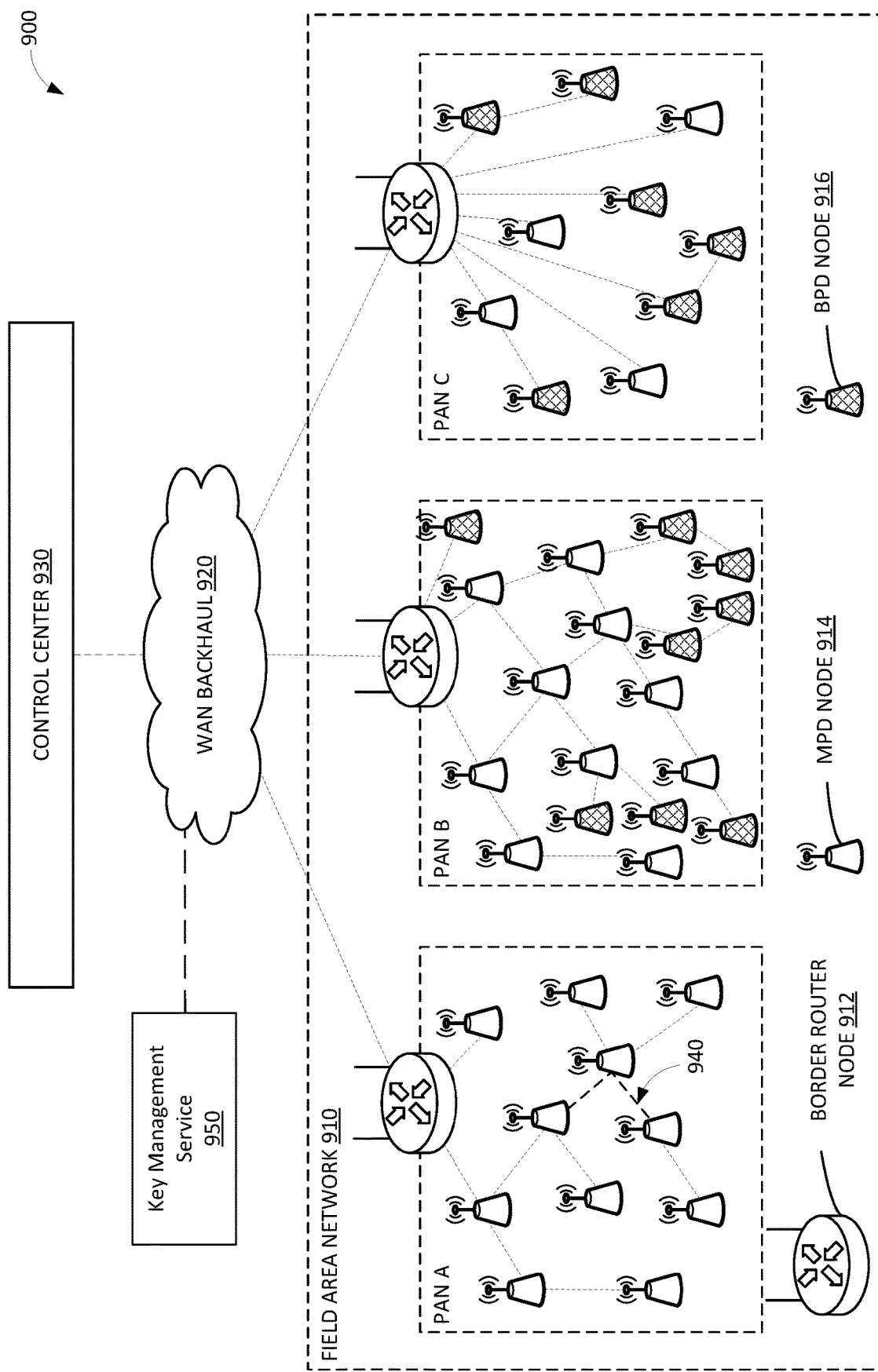
FIG. 9 illustrates a network system, according to one or more aspects of the various embodiments.

FIG. 9 illustrates a network system configured to implement one or more aspects of the present embodiments. As shown, network system 900 includes a field area network (FAN) 910, a wide area network (WAN) backhaul 920, a control center 930, and a key management service 950. FAN 910 is coupled to control center 930 and key management service 950 via WAN backhaul 920. Control center 930 is configured to coordinate the operation of FAN 910. Key management service 950 is configured to distribute keys to FAN 910. In some embodiments, key management service 950 is included in control center 930. In various embodiments, key management service 106 described above is an example of key management service 950.

FAN 910 includes personal area network (PANs) A, B, and C. PANs A and B are organized according to a mesh network topology, while PAN C is organized according to a star network topology. Each of PANs A, B, and C includes at least one border router node 912 and one or more mains-powered device (MPD) nodes 914. PANs B and C further include one or more battery-powered device (BPD) nodes 916. Any of border router node 912, the one or more MPD nodes 914, or the BPD nodes 916 can be used to implement the techniques discussed above with respect to FIGS. 1-7. In various embodiments, nodes 102 and 104 are implemented as node 912, 914, or 916. Further, node device 800 shown in FIG. 8 can be implemented in FAN 910 as any of nodes 912, 914, and/or 916.

MPD nodes 914 draw power from an external power source, such as mains electricity or a power grid. MPD nodes 914 typically operate on a continuous basis without powering down for extended periods of time. BPD nodes 916 draw power from an internal power source, such as a battery. BPD nodes 916 typically operate intermittently and power down, go to very low power mode, for extended periods of time in order to conserve battery power.

MPD nodes 914 and BPD nodes 916 are coupled to, or included within, a utility distribution infrastructure (not shown) that distributes a resource to consumers. MPD nodes 914 and BPD nodes 916 gather sensor data related to the distribution of the resource, process the sensor data, and communicate processing results and other information to control center 930. Border router nodes 912 operate as access points to provide MPD nodes 914 and BPD nodes 916 with access to control center 930.

Any of border router nodes 912, MPD nodes 914, and BPD nodes 916 are configured to communicate directly with one or more adjacent nodes via bi-directional communication links 940. The communication links 940 may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link 940 with the neighboring node. Each neighboring node may update a respective neighbor table to include information concerning the other node, including the MAC address of the other node as well as a received signal strength indication (RSSI) of the communication link 940 established with that node.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across WAN backhaul 920 to control center 930. Similarly, control center 930 can transmit data packets across WAN backhaul 920 and across any given PAN to a particular node included therein. As a general matter, numerous routes can exist which traverse any of PANs A, B, and C and include any number of intermediate nodes, thereby allowing any given node or other component within network system 900 to communicate with any other node or component included therein. Further, in various embodiments, each node in FAN 910 can perform key management and key mismatch resolution for a key stored at the node.

Control center 930 includes one or more server machines (not shown) configured to operate as sources for, or destinations of, data packets that traverse within network system 900. The server machines can query nodes within network system 900 to obtain various data, including raw or processed sensor data, power consumption data, node/network throughput data, status information, and so forth. The server machines can also transmit commands and/or program instructions to any node within network system 900 to cause those nodes to perform various operations.

Key management service 950 includes one or more server machines (not shown) configured to operate as sources for keys for use by nodes in FAN 910. The server machines can generate keys, initiate key rollovers to push keys to nodes in FAN 910, validate a key in response to a key validation request, and transmit a key update to a node in response to a key validation request from the node.

In sum, a given node in a mesh network can identify an outdated encryption/decryption key being used by itself or by another node in communication with the given node. A key, along with a version identifier of the key, is distributed to nodes in the mesh network by a key management service. When a first node, using a first key for encryption, sends an encrypted message to a second node, a version identifier of the first key accompanies the message. The second node checks whether a second key stored at the second node is outdated based on a comparison of the version identifiers of the of the first and second keys. If the second node determines that the second key is outdated, then the second node can enter a key validation state, in which the second node can request a new key from the service. If the second node determines that the first key is outdated, then the second node can inform the first node that the first key is outdated.

Further, in various embodiments, a node in the mesh network can perform key mismatch resolution in response to failures associated with a key stored at the node. A node can enter a time period for counting key failures in response to a first failure associated with the key and when a certain defined time period has elapsed since that first failure. When the count of key failures is at least a threshold number, and a time period permitting key update requests has been reached, the node request a new key from a key management service.

At least one technical advantage of the disclosed techniques is that, with the disclosed techniques, nodes in a network can easily identify outdated encryption keys that are still in use in the network. Accordingly, outdated keys can be replaced with new keys in a timely manner. This keeps the nodes up to date with respect to messaging security, thus improving the communication security of the network. Further, timely updating keys reduces wasted bandwidth within the network by nodes communicating encrypted messages that cannot be decrypted by the receiving nodes. Another technical advantage of the disclosed techniques is that, with the disclosed techniques, by controlling the conditions under which a node is allowed to request an updated key, the number of key update requests is reduced. This reduces the network bandwidth that is consumed by key update requests. This also reduces the computational load on the key management service responsible for distributing keys to nodes in the network.

1. According to some embodiments a method comprises receiving, by a first node in a network, a first message from a second node; determining, by the first node, that a first key usable by the first node to decrypt the first message is outdated based on a comparison of a first key version identifier associated with the first key and a second key version identifier associated with a second key, wherein the second key was used to encrypt the first message, and the second key version identifier is received by the first node from the second node with the first message; and in response to determining that the first key is outdated, transmitting, by the first node to a key management service, a first request for an updated version of the first key to replace the first key.

2. The method according to clause 1, wherein the first key version identifier is a timestamp associated with the first key, and the second key version identifier is a timestamp associated with the second key.

3. The method according to clause 1 or clause 2, wherein the first key version identifier is a version number associated with the first key, and the second key version identifier is a version number associated with the second key.

4. The method according to any of clauses 1-3, further comprising, in response to determining that the first key is outdated, performing, by the first node, key mismatch resolution associated with the first key before transmitting the first request for the updated version of the first key to replace the first key.

5. The method according to any of clauses 1-4, wherein performing the key mismatch resolution comprises determining that a failure counter is equal to or greater than a threshold, wherein the failure counter is indicative of failures associated with the first key.

6. The method according to any of clauses 1-5, wherein performing the key mismatch resolution comprises counting a number of failures with the first key during a failure counting period.

7. The method according to any of clauses 1-6, wherein performing the key mismatch resolution comprises determining that a current time is later than a time period for blocking requests for an updated version of the first key.

8. The method according to any of clauses 1-7, further comprising transmitting, by the first node, a second message to a third node, wherein the second message is encrypted by the first node using the first key; receiving, by the first node, an outdated key notification associated with the first key from the third node; and based on the outdated key notification, transmitting, by the first node to the key management service, a second request for an updated version of the first key to replace the first key.

9. The method according to any of clauses 1-8, further comprising: receiving, by the first node, a second message from the second node, wherein the second message is encrypted by the second node using a third key; determining that the first key and the third key match; and in response to determining that the first key and the third key match, decrypting the second message using the first key.

10. According to some embodiments, one or more non-transitory computer-readable media storing instructions which, when executed by one or more processors of a first node of a mesh network, cause the one or more processors to perform operations comprising receiving a message from a second node; detecting that a first key stored at the first node is outdated based on a determination that a second key used by the second node to encrypt the message is newer than the first key; and in response to detecting that the first key is outdated, transmitting, by the first node to a key management service, a key validation request associated with the first key.

11. The one or more non-transitory computer-readable media according to clause 10, wherein the operations further comprise, in response to detecting that the first key is outdated, performing key mismatch resolution associated with the first key before transmitting the key validation request associated with the first key.

12. The one or more non-transitory computer-readable media according to clause 10 or clause 11, wherein performing the key mismatch resolution comprises determining that a failure counter is equal to or greater than a minimum failure count, wherein the failure counter counts failures associated with the first key.

13. The one or more non-transitory computer-readable media according to any of clauses 10-12, wherein detecting that the first key is outdated comprises determining that a first key version identifier of the first key and a second key version identifier of the second key indicates that the first key is an earlier version of a key than the second key.

14. The one or more non-transitory computer-readable media according to any of clauses 10-13, wherein the operations further comprise detecting that the first key is outdated comprises receiving an outdated key notification associated with the first key from a third node.

15. The one or more non-transitory computer-readable media according to any of clauses 10-14, wherein the operations further comprise receiving a second message from the second node, wherein the second key is used to encrypt the second message; detecting that the second key is outdated; and in response to detecting that the second key is outdated, transmitting, to the second node, an outdated key notification associated with the second key.

16. The one or more non-transitory computer-readable media according to any of clauses 10-15, wherein the operations further comprise receiving a second message from the second node, wherein a third key is used to encrypt the second message; detecting that the first key and the third key are a same key; and based on detecting that the first key and the third key are the same key, decrypting the second message using the first key.

17. According to some embodiments, a node device in a mesh network comprises one or more processors; and a memory storing executable instructions that, when executed by the one or more processors, cause the one or more processors to receive an encrypted communication from a second node device; determine that a first version of a key stored in the memory is out of date based on a comparison of a first version timestamp associated with the first version and a second version timestamp associated with a second version of the key, wherein the encrypted communication is encrypted using the second version of the key, and the second version timestamp is received by the node device from the second node device with the encrypted communication; and in response to determining that the first version of the key stored in the memory is out of date, transmit, to a key management service, a key update request for an updated version of the key.

18. The node device according to clause 17, wherein the instructions, when executed by the one or more processors, further cause the one or more processors to, in response to identifying the out of date first version of the key, perform key mismatch resolution associated with the first version prior to transmitting the key update request.

19. The node device according to clause 17 or clause 18, wherein performing the key mismatch resolution comprises counting a number of failures associated with the first version of the key that is at least a threshold and determining that a time period for blocking the key update request has elapsed.

20. The node device according to any of clauses 17-19, wherein the instructions, when executed by the one or more processors, further cause the one or more processors to transmit a second encrypted communication to a third node device, wherein the second encrypted communication is encrypted using the first version of the key; receive a communication from the third node device acknowledging the second encrypted communication, wherein the communication from the third node device comprises information indicating that the first version of the key is out of date; and based on the information indicating that the first version of the key is out of date, transmit, to the key management service, a second key update request.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   receiving, by a first node in a network, a first message from a second node;
   determining, by the first node, that a first key usable by the first node to decrypt the first message is outdated based on a comparison of a first key version identifier associated with the first key and a second key version identifier associated with a second key, wherein the second key was used to encrypt the first message, and the second key version identifier is received by the first node from the second node with the first message; and
   in response to determining that the first key is outdated, transmitting, by the first node to a key management service, a first request for an updated version of the first key to replace the first key.

2. The method of claim 1, wherein the first key version identifier is a timestamp associated with the first key, and the second key version identifier is a timestamp associated with the second key.

3. The method of claim 1, wherein the first key version identifier is a version number associated with the first key, and the second key version identifier is a version number associated with the second key.

4. The method of claim 1, further comprising, in response to determining that the first key is outdated, performing, by the first node, key mismatch resolution associated with the first key before transmitting the first request for the updated version of the first key to replace the first key.

5. The method of claim 4, wherein performing the key mismatch resolution comprises determining that a failure counter is equal to or greater than a threshold, wherein the failure counter is indicative of failures associated with the first key.

6. The method of claim 4, wherein performing the key mismatch resolution comprises counting a number of failures with the first key during a failure counting period.

7. The method of claim 4, wherein performing the key mismatch resolution comprises determining that a current time is later than a time period for blocking requests for an updated version of the first key.

8. The method of claim 1, further comprising:
   transmitting, by the first node, a second message to a third node, wherein the second message is encrypted by the first node using the first key;
   receiving, by the first node, an outdated key notification associated with the first key from the third node; and
   based on the outdated key notification, transmitting, by the first node to the key management service, a second request for an updated version of the first key to replace the first key.

9. The method of claim 1, further comprising:
   receiving, by the first node, a second message from the second node, wherein the second message is encrypted by the second node using a third key;
   determining that the first key and the third key match; and
   in response to determining that the first key and the third key match, decrypting the second message using the first key.

10. One or more non-transitory computer-readable media storing instructions which, when executed by one or more processors of a first node of a mesh network, cause the one or more processors to perform operations comprising:

receiving a message from a second node;

detecting that a first key stored at the first node is outdated based on a determination that a second key used by the second node to encrypt the message is newer than the first key; and in response to detecting that the first key is outdated, transmitting, by the first node to a key management service, a key validation request associated with the first key.

11. The one or more non-transitory computer-readable media of claim 10, wherein the operations further comprise, in response to detecting that the first key is outdated, performing key mismatch resolution associated with the first key before transmitting the key validation request associated with the first key.

12. The one or more non-transitory computer-readable media of claim 11, wherein performing the key mismatch resolution comprises determining that a failure counter is equal to or greater than a minimum failure count, wherein the failure counter counts failures associated with the first key.

13. The one or more non-transitory computer-readable media of claim 10, wherein detecting that the first key is outdated comprises determining that a first key version identifier of the first key and a second key version identifier of the second key indicates that the first key is an earlier version of a key than the second key.

14. The one or more non-transitory computer-readable media of claim 10, wherein the operations further comprise detecting that the first key is outdated comprises receiving an outdated key notification associated with the first key from a third node.

15. The one or more non-transitory computer-readable media of claim 10, wherein the operations further comprise:

receiving a second message from the second node, wherein the second key is used to encrypt the second message;

detecting that the second key is outdated; and in response to detecting that the second key is outdated, transmitting, to the second node, an outdated key notification associated with the second key.

16. The one or more non-transitory computer-readable media of claim 10, wherein the operations further comprise:

receiving a second message from the second node, wherein a third key is used to encrypt the second message;

detecting that the first key and the third key are a same key; and based on detecting that the first key and the third key are the same key, decrypting the second message using the first key.

17. A node device in a mesh network, comprising:

one or more processors; and a memory storing executable instructions that, when executed by the one or more processors, cause the one or more processors to:

receive an encrypted communication from a second node device;

determine that a first version of a key stored in the memory is out of date based on a comparison of a first version timestamp associated with the first version and a second version timestamp associated with a second version of the key, wherein the encrypted communication is encrypted using the second version of the key, and the second version timestamp is received by the node device from the second node device with the encrypted communication; and in response to determining that the first version of the key stored in the memory is out of date, transmit, to a key management service, a key update request for an updated version of the key.

18. The node device of claim 17, wherein the instructions, when executed by the one or more processors, further cause the one or more processors to, in response to identifying the out of date first version of the key, perform key mismatch resolution associated with the first version prior to transmitting the key update request.

19. The node device of claim 18, wherein performing the key mismatch resolution comprises:

counting a number of failures associated with the first version of the key that is at least a threshold, and determining that a time period for blocking the key update request has elapsed.

20. The node device of claim 17, wherein the instructions, when executed by the one or more processors, further cause the one or more processors to:

transmit a second encrypted communication to a third node device, wherein the second encrypted communication is encrypted using the first version of the key;

receive a communication from the third node device acknowledging the second encrypted communication, wherein the communication from the third node device comprises information indicating that the first version of the key is out of date; and based on the information indicating that the first version of the key is out of date, transmit, to the key management service, a second key update request.

* * * * *